H. MAXIM.
POSITION INDICATOR OR RECORDER.
APPLICATION FILED DEC. 29, 1914.

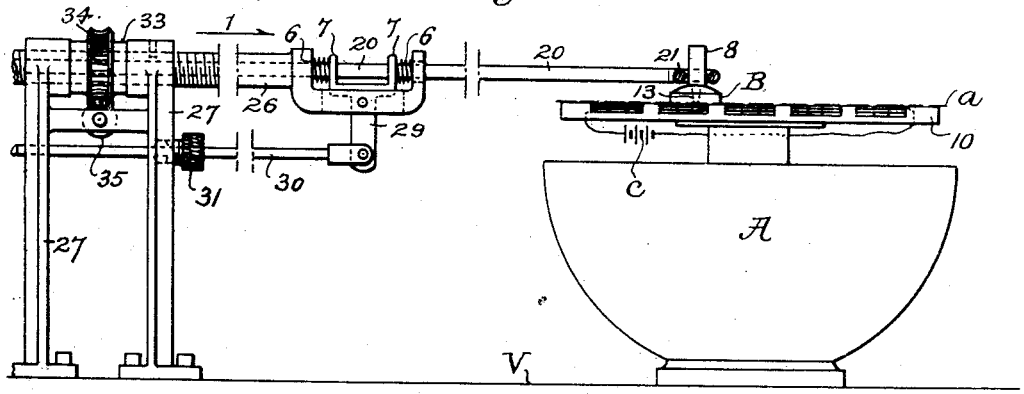
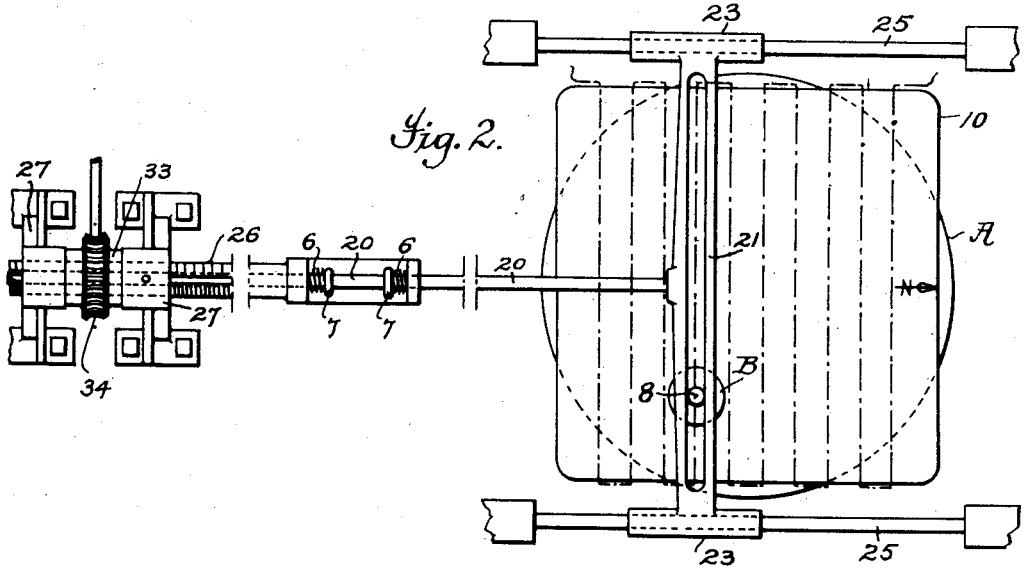
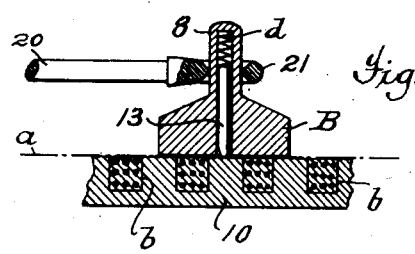

1,310,201.

Patented July 15, 1919.
2 SHEETS—SHEET 2.

Witnesses:
Lillian Maxim
Geo. N. Graham

Inventor
Hudson Maxim

UNITED STATES PATENT OFFICE.

HUDSON MAXIM, OF HOPATCONG BOROUGH, NEW JERSEY.

POSITION INDICATOR OR RECORDER.

1,310,201.   Specification of Letters Patent.   Patented July 15, 1919.

Application filed December 29, 1914. Serial No. 879,466.

*To all whom it may concern:*

Be it known that I, HUDSON MAXIM, a citizen of the United States, residing in the borough of Hopatcong, Sussex county, and State of New Jersey, have invented certain new and useful Improvements in Position Indicators or Recorders, of which the following is a description.

The object of the invention is mainly to indicate upon a map or chart as nearly as practicable the exact geographical position at all times of the vehicle, vessel, or other conveyance employing the indicator, especially submarine vessels.

In carrying out the invention, I employ a map or chart, fixed with respect to the mariner's compass, that is to say the north of the chart is maintained in its north position no matter what the direction of the vehicle, with which is combined a recording or indicating stylus or marker supported by the vehicle, and consequently movable with it with respect to a chart magnetically or gyroscopically fixed with respect to north and south, with means for moving the stylus or marker on the chart, or one with respect to the other, proportionately to the speed of the vehicle, so that the stylus not only records the movements of the vehicle but also its direction of travel.

In practice I prefer to employ a gyroscopically north and south maintained compass, and what is in effect a mariner's compass, and on the card or table of which compass a map or chart, suited to the location, is supported and attached.

Upon the map or chart is mounted a stylus or marker, preferably magnetically held upon or attached to the map or chart, so that it is not moved or shifted by rolling or pitching of the vessel or other vehicle carrying it; and the stylus or marker is firmly held in fixed position with respect to north and south and thereby prevented from rotating.

The stylus or marker is so movably connected or adjusted to a moving or shifting device or mechanism fixedly attached to the boat or vessel or other vehicle, that the vessel or other vehicle may turn freely in any direction, thereby rotating partly or wholly about the stylus or marker without in the least moving or shifting the marker upon the map or chart, but the marking or shifting device is able to move the marker upon the map or chart in any direction in which the vessel or vehicle may be moving at the time, forward or backward, by its propelling mechanism.

The moving or shifting device is connected with the propelling mechanism of the vessel or vehicle by suitable reduction gears or block-work, or other device, so that the forward or backward movement of the stylus upon the map or chart is always proportionate to the speed and distance traveled by the vessel or vehicle during a given period; and without rotating or shifting the stylus upon the map or chart except in a forward or backward position in line with the longitudinal axis of the vessel or vehicle.

Any suitable translating mechanism may be employed between the propeller or the propelling mechanism of the vessel or other vehicle and the position indicator or the stylus-moving mechanism. However, I preferably employ an electrical step-by-step driver for communicating the electrical impulses from rotations of the shaft or its revolutions recorder to the stylus shifting mechanism, whereby the backward or forward movement of the stylus upon the map or chart on the line of the longitudinal axis of the vessel or vehicle is made proportionate to the forward or backward movement of the boat or vessel through the water or the vehicle over the land or through the air.

In the preferred embodiment of the invention as herein exemplified, the north-and-south maintained compass card is in the form of an electro-magnetic table, or what is known as a magnetic clutch, on the top surface of which the chart rests and to which it is properly secured; and the stylus-carrier or holder movable over the chart is in fact a soft iron block or plate acting in the nature of a keeper. The stylus or pencil is supported in a central recess in the carrier or holder and is spring pressed so as to trace or mark on the surface of the chart the movements of the holder. Obviously, the conditions of the chart-supporting plate or table and the stylus-holder may be reversed, that is to say the plate or table may be the keeper and the stylus-holder the electromagnet. The first mentioned form, however, is preferred.

The accompanying drawings illustrate a practical embodiment of the invention, in which drawings:

Figure 1, is a side elevation thereof, parts being fore-shortened to accommodate the view to the sheet;

Fig. 2 is a plan view;

Fig. 4, is an enlarged sectional detail of the stylus-holder and the magnetic plate or table.

Figure 5:
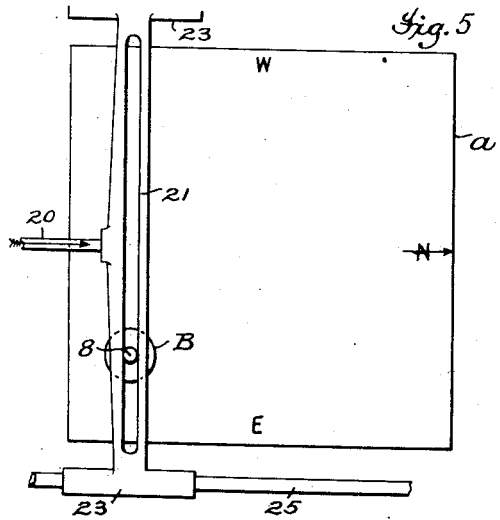
Figs. 5, 6, 7 and 8 are diagrams of the recording movements of the stylus.

Referring to said drawings, Figs. 1 and 2, the mariner's compass A, the gyroscope form being preferred, is supported, say at any point on the longitudinal axis of the vessel V, with its compass card or table 10, carrying the map or chart $a$, the north of the chart being fixed with respect to the north of the compass, and consequently fixed with respect to any direction or change in direction of the movement or course of the vessel.

The table 10 is in its preferred construction, an electro-magnet, and to this end is formed with a number of parallel equi-distant grooves $b$, see Fig. 4, in which is properly wound a suitable number of coils of the required sized silk or other covered insulated wire in circuit with a generator or battery $c$, Fig. 1.

The carrier or holder B, supporting the stylus or marker 13, is a round or otherwise shaped disk or plate of soft iron and in effect forms the keeper for the electro-magnet plate. The under surface of the holder bears upon the upper surface of the plate except that the thin paper map or chart $a$, is interposed between the two surfaces, and hence the magnetism of the plate must be great enough to affect the holder or keeper B, to hold it fixed on the map whenever the course of the vessel is being changed and yet permit it to be moved over the surface of the map and the plate on the application of sufficient force thereto.

The stylus or marker 13, in the present instance is a pencil extending axially in the holder B and has a suitable spring $d$, to force its lower end against the chart to mark or trace the movements of the holder.

The center of the holder has a vertical stem 8, which is loosely engaged by a motive power driven rod 20, by which the holder with its stylus 13 is moved over the surface of the chart proportionately with the speed of the vessel or other vehicle. To allow, however, for the many changes in the course of the vessel, there is provided a lateral slip or sliding connection between the stylus or its holder and its driven rod 20, which in this instance is formed by a slotted head 21, extending transversely of the longitudinal axis of the vessel and of the travel of said rod 20. The slotted head 21, is suitably guided and supported at each end by anti-friction sleeves or runners 23 mounted on rods 25 fixed to the vessel on opposite sides of the compass plate and extending in lines parallel with the longitudinal axis of the vessel.

The driven rod 20, is mounted to freely slide within a longitudinally movable driving sleeve or tube 26, that is suitably supported and guided in one or more properly disposed bearings 27, fixed to the vessel. The construction being such that when the vessel rotates with respect to the chart, and no appreciable forward or backward movement of the vessel occurs, the stylus will remain practically stationary on the chart, owing to the free sliding of the rod 20, in the driving sleeve 26, until such time as the longitudinal movement of the vessel is resumed, or in other words until it proceeds on its course.

To permit this free movement of the driven rod 20, with respect to the driving sleeve 26, there is provided a suitable clutch or tight and loose connection between the two, arranged so that when the sleeve is moved longitudinally through its bearing or bearings 27, the rod will be coupled to it, and the both moved as a unit, but when the change in direction of the vessel is more rapid than the longitudinal driving movement of the sleeve, the rod will be free to move irrespective and independent of the sleeve. Such a clutch connection is represented by a depending dog 29, pivoted to the sleeve 26, and having two widely separated eyes 7, embracing the rod 20, which when the dog hangs vertically with its eyes parallel with the axis of the rod, allows the rod to slide freely through them, but when the dog is moved the slightest extent out of vertical, its eyes will clutch the rod and thus positively connect the rod and sleeve together. This clutching or clamping movement of the dog to the rod 20, may be had by a stem 30, pivotally connected to the depending portion of the dog with its free end extending parallel with the sleeve, and passing through a friction device represented by a stuffing box or gland 31, that is supported by the bearing 27, and made adjustable to vary the degree of friction exerted on said stem. In operation it will be obvious that, say, when the sleeve 26, is moved forward in the direction of the arrow 1, Fig. 1, the drag or friction on the stem 30, will cause the dog to be very slightly rocked, so that its eyes cramp or clutch the rod 20, thus coupling the sleeve and rod together; and that the least tendency of the rod to move independently of the sleeve, and hence of the dog, will for the time being render the clutch of the dog ineffective. This unclutching of the dog from the rod may be rendered more effective by the use of suitable springs 6, tending to hold the dog vertical with respect to the sleeve as soon as its driving action ceases or is sufficiently less during the turning movement of the vessel so that the stylus will remain fixed on the chart.

The driving sleeve 26, may of course be moved longitudinally proportionately to the movement of the vesseel by suitable connections with the vessel's motive power, propelling mechanism or its log.

Figure 3:
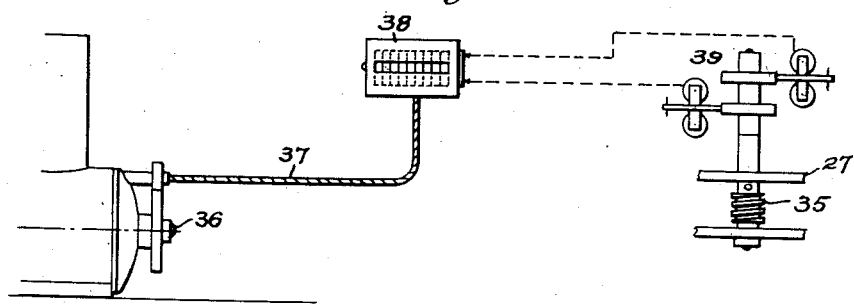
Fig. 3 is a diagrammatic view, showing a mode of driving the stylus-marker proportionate to the speed of the propelling mechanism, or its revolutions-recorder.

Thus for convenience of illustration, and for showing one of the many modes of obtaining the movement of the stylus over the chart proportionate to the speed of the vessel, the driving sleeve as shown in Figs. 1 and 2, is screw-threaded more or less its entire length with the threads of which engages a nut 33, mounted between the bearings 27, and having a worm wheel 34, in gear with a worm 35, supported in cross brackets of said bearings, so that rotations of the worm and worm wheel and its nut will move the driving sleeve 26 longitudinally through its bearings either forward or backward according as the propelling mechanism moves the vessel either forward or backward. In the diagram, Fig. 3, the shaft 36, of the propelling engine is connected by proper gearing through say a flexible shaft 37 to the revolutions-recorder 38, from which by suitable electrical and mechanical translating devices 39, not shown in detail but in conventional form, forward or backward rotations are imparted to the spindle to which the worm 35 is fixed.

Figure 6:
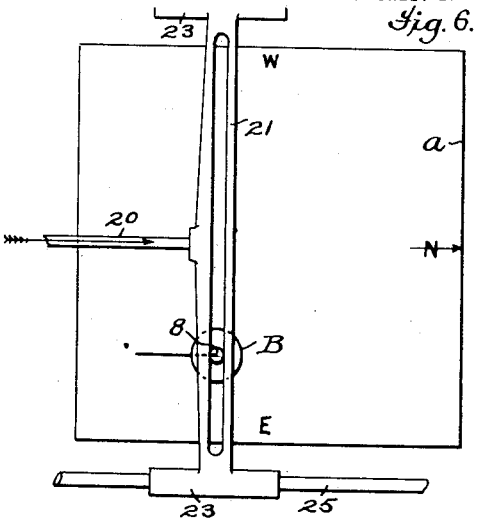
Figure 7:
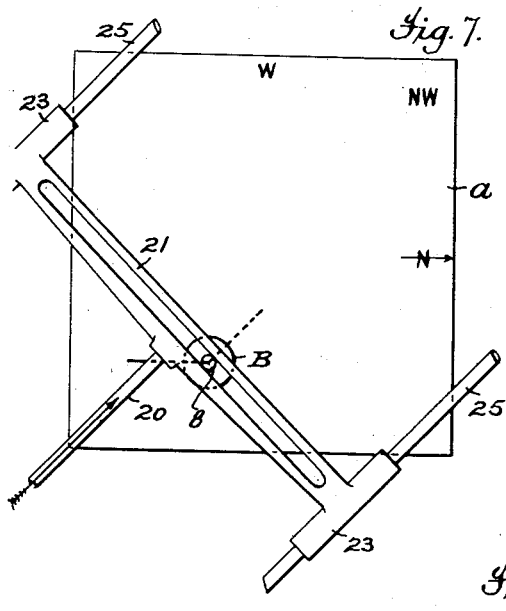
Figure 8:
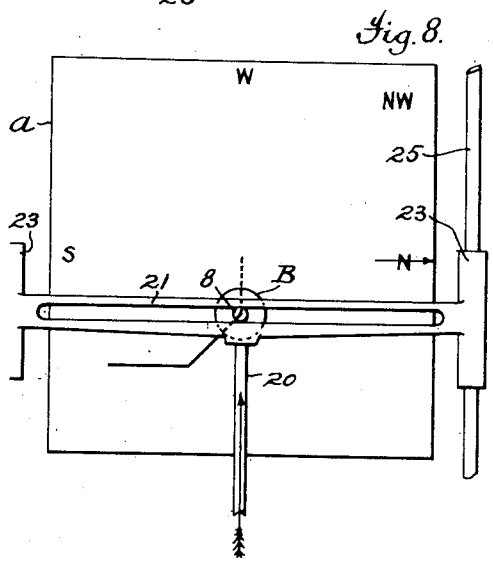

In operation, referring to the diagrams, Figs. 5 to 8 inclusive, assuming the stylus-holder B, to be at the south-eastern portion of the chart a, and the vessel is moving substantially due north, so long as this course is continued, a straight line directed northward will be marked on the chart, the holder having been moved from the position shown in Fig. 5, to that shown in Fig. 6, making a straight line as indicated in the latter view. If, after proceeding, the course of the vessel is changed to north-west, as in Fig. 7, and its forward movement continued, the chart remaining with its north maintained north, the stylus-holder remaining fixed with respect to the chart during such change in the course of the vessel, the marking of the stylus will be directed to the north-west as indicated by dotted lines in said Fig. 7; and if then, after keeping this north-west course, say for many miles, the course of the vessel be again changed to, say due west, the continued marking of the stylus will be directed westerly as indicated in Fig. 8. It will be noted that not only will each point of variation of the course of the vessel be indicated on the chart, but that the distance traveled on each of its courses will be recorded.

While the present invention, as before stated, is particularly adapted to submarines, whose efficiency is enhanced by constant under-water travel, it is, however, also adapted to other vehicles such as automobiles, aeroplanes, dirigible balloons, and other conveyances in the sea, the air, and on the land, to thereby not only record the course of the vehicle, but its distance of travel, and its location at any time during the run.

The clutch driving and slip connections herein shown and described but not claimed, are shown, described and claimed in a co-pending application Serial No. 877,328, filed December 15, 1914.

What is claimed is:

1. In a position indicator, a chart adapted to be maintained in fixed position with respect to points of the compass, a stylus magnetically held on the chart against axial movement and means for moving one with respect to the other.

2. In a position indicator, a chart, means for maintaining the chart in fixed position with respect to points of the compass, a stylus supported by and magnetically held thereon against axial movement, a power-shaft, and means for moving the stylus over the chart operated by said power-shaft.

3. In a position indicator, a movable support, an electro-magnetic plate provided with a chart, an armature supported thereby and having a stylus bearing on the chart, said chart and plate being maintained in fixed position with respect to points of the compass, and means for moving the armature and stylus over the plate.

4. In a position indicator, a chart, a plate provided with a plurality of magnetized poles for supporting the same, and a stylus supported by and movable on said chart and magnetically retained thereon against axial movement.

5. A combined mariner's compass and position indicator, consisting of a map or chart, means holding the map or chart in a fixed position with respect to the points, of the compass, a marker or stylus magnetically held on the chart against axial movement, together with means whereby the stylus or marker is moved backward or forward upon the map or chart, on a line parallel to the longitudinal axis of the vehicle, at a rate of movement proportionate to the rate of movement of the vehicle, whereby the direction traveled by the vehicle and its geographical position is indicated on the map or chart.

6. In combination with propelling means, a north and south maintained chart, a magnetically attracted stylus-holder supported by and movable over the chart, and axially unaffected by change in its direction, and means connected with said propelling means to move the stylus holder over the chart proportionately to the movement of said propelling means.

7. In combination with propelling means, a mariner's compass, a chart supported thereby, a magnetically attracted stylus-holder movable over the chart and axially unaffected by change in its direction, and means connected with said propelling means to move the stylus-holder over the chart proportionately to the movement of the propelling means, and also in the direction of the movement of the vessel.

8. A mariner's compass, a chart supported thereby, a magnetically attracted stylus-holder movable over the chart and axially unaffected by change in its direction coincident with the longitudinal axis of the vehicle carrying the chart, means connected with the propulsive agent of the vehicle by which the stylus-holder is moved over the chart proportionate to the movement of such propulsive agent, and loose connections between said stylus-holder and its mover whereby when the vehicle is turned in its course the stylus-holder remains stationary on the chart.

In testimony whereof I have signed my name to this specification in the presence of two subscribing witnesses.

HUDSON MAXIM.

Witnesses:
   ELISHA T. EVERETT,
   GEO. H. GRAHAM.